(12) United States Patent
Tanno

(10) Patent No.: US 8,997,805 B2
(45) Date of Patent: Apr. 7, 2015

(54) PNEUMATIC TIRE AND METHOD OF MANUFACTURING THE SAME

(75) Inventor: Atsushi Tanno, Hiratsuka (JP)

(73) Assignee: The Yokohama Rubber Co., Ltd., Tokyo (JP)

(*) Notice: Subject to any disclaimer, the term of this patent is extended or adjusted under 35 U.S.C. 154(b) by 1048 days.

(21) Appl. No.: 11/919,113

(22) PCT Filed: Apr. 27, 2006

(86) PCT No.: PCT/JP2006/308849
§ 371 (c)(1),
(2), (4) Date: Jan. 15, 2009

(87) PCT Pub. No.: WO2006/118198
PCT Pub. Date: Nov. 9, 2006

(65) Prior Publication Data
US 2009/0199942 A1    Aug. 13, 2009

(30) Foreign Application Priority Data

Apr. 28, 2005   (JP) .................... 2005-131923

(51) Int. Cl.
*B29C 65/08*     (2006.01)
*B29C 65/02*     (2006.01)
(Continued)

(52) U.S. Cl.
CPC .............. *B29C 65/08* (2013.01); *B29C 65/02* (2013.01); *B29C 65/56* (2013.01); *B29C 65/7443* (2013.01); *B29C 66/21* (2013.01); *B29C 66/304* (2013.01); *B29C 66/45* (2013.01); *B29C 66/80* (2013.01); *B29C 66/81422* (2013.01); *B29C 66/8322* (2013.01); *B29D 30/0061* (2013.01);
(Continued)

(58) Field of Classification Search
USPC ........................................... 152/157
See application file for complete search history.

(56) References Cited

U.S. PATENT DOCUMENTS 2,040,645 A    5/1936   Dickinson
4,031,940 A    6/1977   Bartley et al.
(Continued)

FOREIGN PATENT DOCUMENTS

DE    198 06 935         9/1999
DE    19806935 A1 *      9/1999
(Continued)

OTHER PUBLICATIONS

Office action issued in U.S. Appl. No. 12/422,548 dated May 6, 2011.
(Continued)

*Primary Examiner* — Ryan Ochylski
(74) *Attorney, Agent, or Firm* — Greer Burns & Crain, Ltd.

(57) ABSTRACT

Provided is a pneumatic tire in which the adhesion of a noise absorbing member formed of a porous material is improved. A pneumatic tire according to the present invention includes a resin layer, a noise absorbing member and a locking member. The resin layer is formed of any one of a thermoplastic resin and a thermoplastic elastomeric composition obtained by dispersing an elastomer in a thermoplastic resin, and is formed on at least a part of the inner surface of the tire. The noise absorbing member is formed of a porous material, and is disposed on the resin layer. The locking member is formed of a thermoplastic resin, and is bonded to the resin layer through the noise absorbing member by thermal fusion.

6 Claims, 6 Drawing Sheets

(51) Int. Cl.

| | |
|---|---|
| B29C 65/56 | (2006.01) |
| B29C 65/74 | (2006.01) |
| B29C 65/00 | (2006.01) |
| B29D 30/00 | (2006.01) |
| B60C 5/14 | (2006.01) |
| B60C 19/00 | (2006.01) |
| B29K 1/00 | (2006.01) |
| B29K 75/00 | (2006.01) |
| B29K 101/10 | (2006.01) |
| B29K 101/12 | (2006.01) |
| B29K 105/04 | (2006.01) |
| B29L 30/00 | (2006.01) |

(52) U.S. Cl.

CPC ............... B60C 5/14 (2013.01); B60C 19/002 (2013.01); B29C 66/81417 (2013.01); B29C 66/71 (2013.01); B29K 2001/12 (2013.01); B29K 2001/14 (2013.01); B29K 2075/00 (2013.01); B29K 2101/10 (2013.01); B29K 2101/12 (2013.01); B29K 2105/04 (2013.01); B29K 2995/0002 (2013.01); B29L 2030/00 (2013.01)

(56) References Cited

U.S. PATENT DOCUMENTS

| | | | |
|---|---|---|---|
| 4,096,898 | A | 6/1978 | Messerly et al. |
| 4,216,812 | A | 8/1980 | Bourne |
| 4,287,930 | A | 9/1981 | McIntosh et al. |
| 4,340,104 | A | 7/1982 | Kuan |
| 4,681,147 | A | 7/1987 | Hugele |
| 5,658,987 | A | 8/1997 | Nakamura |
| 6,217,683 | B1* | 4/2001 | Balzer et al. ............... 156/60 |
| 6,538,066 | B2 | 3/2003 | Watanabe et al. |
| 6,726,289 | B2 | 4/2004 | Yukawa et al. |
| 7,455,092 | B2 | 11/2008 | Yukawa et al. |
| 7,490,644 | B2 | 2/2009 | Yukawa |
| 7,677,286 | B2 | 3/2010 | Tanno |
| 2003/0111156 | A1 | 6/2003 | McNichols et al. |
| 2005/0046978 | A1 | 3/2005 | Schofield et al. |
| 2005/0205183 | A1* | 9/2005 | Yukawa ............... 152/450 |
| 2005/0247391 | A1 | 11/2005 | Ikuta |
| 2005/0275277 | A1 | 12/2005 | Yukawa |
| 2006/0108042 | A1 | 5/2006 | Yukawa et al. |
| 2007/0199636 | A1 | 8/2007 | Tanno |
| 2009/0199942 | A1 | 8/2009 | Tanno |
| 2009/0242094 | A1 | 10/2009 | Kato et al. |
| 2009/0314402 | A1 | 12/2009 | Kuramori et al. |
| 2009/0314403 | A1 | 12/2009 | Tanno |
| 2009/0320980 | A1 | 12/2009 | Tanno |
| 2010/0032073 | A1 | 2/2010 | Tanno et al. |

FOREIGN PATENT DOCUMENTS

| | | |
|---|---|---|
| GB | 1 359 468 | 7/1974 |
| JP | 62-216803 | 9/1987 |
| JP | 1-078902 | 3/1989 |
| JP | 64-078902 | 3/1989 |
| JP | 4-159101 | 6/1992 |
| JP | 06-106903 | 4/1994 |
| JP | 8-217923 | 8/1996 |
| JP | 9-086112 | 3/1997 |
| JP | 2001-113902 | 4/2001 |
| JP | 2003-063208 | 3/2003 |
| JP | 2003-226104 | 8/2003 |
| JP | 2004-042822 | 2/2004 |
| JP | 2004-291855 | 10/2004 |
| JP | 2005-205935 | 8/2005 |
| JP | 2005-238888 | 9/2005 |
| JP | 2005-262921 | 9/2005 |
| JP | 2005-297836 | 10/2005 |
| JP | 2006-044503 | 2/2006 |
| JP | 2006-306285 | 11/2006 |
| WO | WO 03/103989 | 12/2003 |
| WO | WO 2005/012008 | 2/2005 |
| WO | WO 2006/118198 A1 | 11/2006 |
| WO | WO 2006/118200 | 11/2006 |
| WO | WO 2006/118202 | 11/2006 |
| WO | 2007/141973 A1 | 12/2007 |

OTHER PUBLICATIONS

Office action issued in U.S. Appl. No. 12/422,548 dated Mar. 9, 2012.
Office action issued in U.S. Appl. No. 11/919,184 dated Jan. 6, 2012.
Office action issued in U.S. Appl. No. 11/919,184 dated Oct. 27, 2011.
Office action issued in U.S. Appl. No. 11/919,183 dated Oct. 27, 2011.
Office action issued in U.S. Appl. No. 11/919,183 dated Jan. 4, 2012.
Machine translation of JP 2004-291855 dated Oct. 21, 2004.
Office action issued in U.S. Appl. No. 11/919,113 dated Mar. 6, 2012.
Office action issued in U.S. Appl. No. 11/919,113 dated Jul. 26, 2011.
Office action issued in U.S. Appl. No. 12/919,184 dated Jan. 16, 2012.
Office action issued in U.S. Appl. No. 12/919,113 dated Jul. 26, 2011.
Office action U.S. Appl. No. 12/919,184 dated Oct. 27, 2011.
Office action issued in U.S. Appl. No. 12/919,183 dated Oct. 27, 2011.
English machine translation of JP 2004-291855, dated Oct. 21, 2004.
Office action issued in U.S. Appl. No. 12/919,184 dated Jan. 6, 2012.
Office action issued in U.S. Appl. No. 11/886,708 dated Sep. 18, 2007.
Office action issued in U.S. Appl. No. 12/422,548 dated Apr. 13, 2009.
Office action issued in U.S. Appl. No. 11/919,183 dated Sep. 8, 2009.
Office action issued in U.S. Appl. No. 11/919,184 dated Oct. 12, 2009.
Office action issued in U.S. Appl. No. 13/711,121 dated Dec. 11, 2012.
Office action issued in U.S. Appl. No. 13/711,171 dated Dec. 11, 2012.
U.S. Appl. No. 13/895,884, filed May 16, 2013.
U.S. Appl. No. 13/711,171, filed Dec. 11, 2012.
U.S. Appl. No. 11/886,708, filed Sep. 19, 2007.
U.S. Appl. No. 12/919,184, filed Oct. 12, 2009.
U.S. Appl. No. 13/711,121, filed Dec. 11, 2012.
U.S. Appl. No. 11/919,183, filed Sep. 8, 2009.
U.S. Appl. No. 12/422,548, filed Apr. 13, 2009.
U.S. Appl. No. 12/433,975, filed May 1, 2009.
U.S. Appl. No. 13/895,820, filed May 16, 2013.
Office Action issued in U.S. Appl. No. 12/422,548 dated Oct. 13, 2011.
Office Action issued in U.S. Appl. No. 12/422,548 dated Nov. 21, 2012.
Office Action issued in U.S. Appl. No. 12/422,548 dated Mar. 28, 2013.
Office Action issued in U.S. Appl. No. 12/422,548 dated Aug. 28, 2013.
Office Action issued in U.S. Appl. No. 12/422,548 dated Jun. 26, 2014.
Office Action issued in U.S. Appl. No. 11/919,184 dated Sep. 4, 2012.
Office Action issued in U.S. Appl. No. 11/919,184 dated Dec. 12, 2012.
Office Action issued in U.S. Appl. No. 11/886,708 dated Jun. 30, 2010.
Office Action issued in U.S. Appl. No. 11/886,708 dated Oct. 13, 2010.
Office Action issued in U.S. Appl. No. 11/886,708 dated Apr. 26, 2011.
Office Action issued in U.S. Appl. No. 11/886,708 dated Mar. 29, 2012.
Office Action issued in U.S. Appl. No. 11/886,708 dated Jan. 16, 2013.

(56) References Cited

OTHER PUBLICATIONS

Office Action issued in U.S. Appl. No. 13/711,121 dated Sep. 30, 2013.
Office Action issued in U.S. Appl. No. 13/711,171 dated Jun. 11, 2013.
Office Action issued in U.S. Appl. No. 13/711,171 dated Apr. 11, 2013.
U.S. Appl. No. 11/919,184, filed Oct. 12, 2009.
U.S. Appl. No. 14/036,824, filed Sep. 25, 2013.

* cited by examiner (c)

(b)

(a)

PNEUMATIC TIRE AND METHOD OF MANUFACTURING THE SAME

TECHNICAL FIELD

The present invention relates to a pneumatic tire including a noise absorbing member, and to a method of manufacturing the pneumatic tire. To be specific, the present invention relates to a pneumatic tire in which the adhesion of a noise absorbing member formed of a porous material is improved, and also relates to a method of manufacturing the pneumatic tire.

BACKGROUND ART

One of causes of noise generated in a pneumatic tire is cavity resonance sound associated with vibration of the air filled inside the tire. When a tire is rolled, the air inside the tire is vibrated by the vibration of the tread portion due to irregularities of a road surface, which generates the cavity resonance sound.

As a method of reducing noise generated by the cavity resonance phenomenon as described above, it has been proposed that a noise absorbing member is disposed in a cavity portion formed between a tire and a rim of a wheel (refer to Patent Document 1, for example). However, when the noise absorbing member is attached to the outer peripheral surface of the rim of the wheel, the noise absorbing member interferes with the operation of mounting the pneumatic tire on the rim. On the other hand, when the noise absorbing member is attached to the inner surface of the tire, there is a problem in the durability. In addition, when a noise absorbing member formed of a porous material, such as a polyurethane foam, is fixed to the inner surface of the tire with a rubber adhesive agent or an adhesive tape, the noise absorbing member sometimes drops off from the inner surface of the tire due to the insufficient adhesive force.

Patent Document 1: Japanese patent application Kokai publication No. Sho 64-78902

DISCLOSURE OF THE INVENTION

An object of the present invention is to provide a pneumatic tire in which the adhesion of a noise absorbing member formed of a porous material is improved, and also relates to a method of manufacturing the pneumatic tire.

A pneumatic tire according to the present invention for the purpose of solving the above-described problems is characterized by including a resin layer, a noise absorbing member and a locking member. The resin layer is formed of any one of a thermoplastic resin and a thermoplastic elastomeric composition obtained by dispersing an elastomer in a thermoplastic resin, and is formed on at least a part of the inner surface of the tire. The noise absorbing member is formed of a porous material, and is disposed on the resin layer. The locking member is formed of a thermoplastic resin, and is bonded to the resin layer through the noise absorbing member by thermal fusion.

In addition, a method of manufacturing a pneumatic tire according to the present invention for the purpose of solving the above-described problems is characterized by including the steps of curing a pneumatic tire including, on at least a part of the inner surface of the tire, a resin layer which is formed of any one of a thermoplastic resin and a thermoplastic elastomeric composition obtained by dispersing an elastomer in a thermoplastic resin; disposing a noise absorbing member formed of a porous material on the resin layer; and bonding a locking member formed of a thermoplastic resin to the resin layer through the noise absorbing member by thermal fusion.

In the present invention, while the resin layer including a thermoplastic resin as a matrix is formed on the inner surface of the tire, the noise absorbing member is disposed on the resin layer and the locking member formed of a thermoplastic resin is bonded to the resin layer through the noise absorbing member by thermal fusion. Accordingly, even when the noise absorbing member is formed of a thermosetting resin, such as a polyurethane foam, it is possible to firmly fix the noise absorbing member to the inner surface of the tire. The fixation by thermal fusion bonding has an adhesive force stronger than that of the fixation by a rubber adhesive agent or an adhesive tape. For this reason, it is possible to favorably maintain the bonding state of the noise absorbing member formed of the porous material over a long period of time. As a result, it is possible to maintain a noise reduction effect by the noise absorbing member over a long period of time.

It is preferable that the constituent material of the locking member be the same kind of a thermoplastic resin as that included in the resin layer. The difference between the fusing temperature of the locking member and the fusing temperature of the resin layer may be not more than 20° C. When the fusing temperatures approximate to each other, the thermal fusion bonding is facilitated. In addition, it is preferable that the porous material of the noise absorbing member be a polyurethane foam. To be specific, since the polyurethane foam exhibits a favorable noise absorbing characteristic, the polyurethane foam is suitable for the constituent material of the noise absorbing member.

In the pneumatic tire according to the present invention, the resin layer may be formed on a part of the inner surface of the tire as a base for attaching the noise absorbing member to the inner surface of the tire. However, for the purpose of effectively utilizing the material, it is preferable that the resin layer be formed on the entire region of the inner surface of the tire as an air permeation preventive layer. In addition, it is preferable that a portion where the locking member and the resin layer are bonded to each other by thermal fusion is disposed at an interval in the tire circumferential direction, and also that the relation between the interval H and the width W of the noise absorbing member be $0.2W \leq H \leq 4W$. Accordingly, it is possible to secure a favorable durability with the minimum processing.

In the method of manufacturing a pneumatic tire according to the present invention, it is preferable that an ultrasonic welder be used for the thermal fusion bonding of the locking member and the resin layer. When using such an ultrasonic welder, it is possible to heat locally the locking member and the resin layer. Accordingly, it is possible to achieve an excellent balance between the processability and the durability. In addition, when using an oscillating horn having chamfered end portions of the tip in the width direction thereof as an oscillating horn for the ultrasonic welder, it is possible to suppress an occurrence of a whitening phenomenon in the locking member. As a result, the durability can be further improved.

BRIEF DESCRIPTION OF THE DRAWINGS

FIGS. 2(a) to 2(c) are cross-sectional views of processes of the method.

BEST MODES FOR CARRYING OUT THE INVENTION

Hereinafter, descriptions will be given in detail of a configuration of the present invention with reference to the accompanying drawings.

Figure 1:
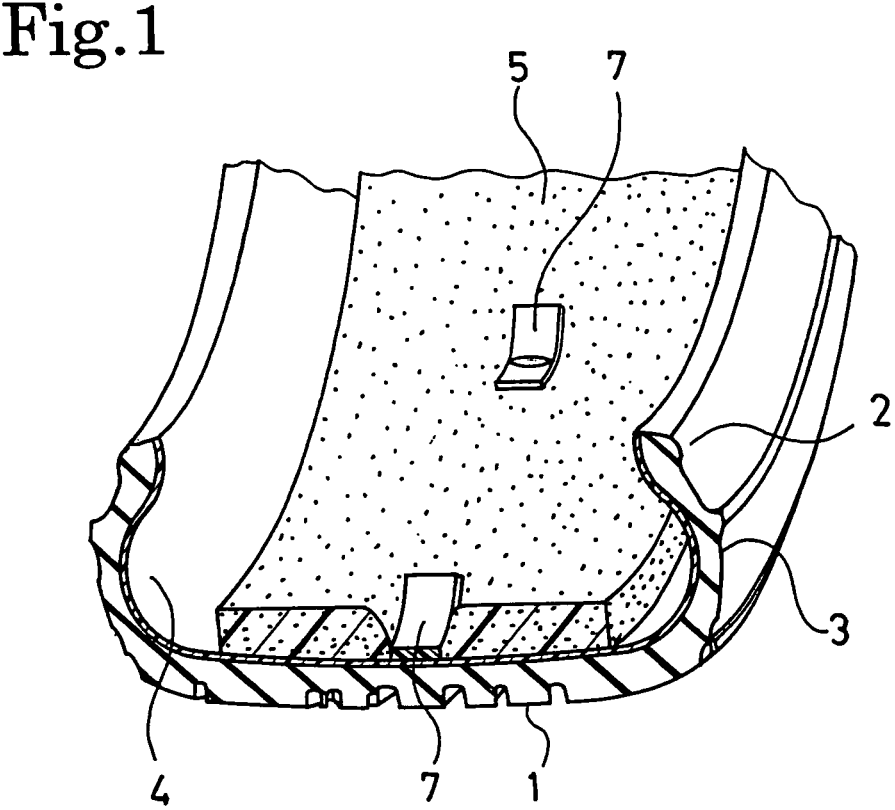
FIG. 1 is a perspective cross-sectional view showing a pneumatic tire according to an embodiment of the present invention.

FIG. 1 shows a pneumatic tire according to an embodiment of the present invention. In FIG. 1, the pneumatic tire includes a tread portion 1, a pair of left and right bead portions 2, and side wall portions 3. Each of the side wall portions 3 connects the tread portion 1 and a corresponding one of the bead portions 2 to each other. A resin layer 4 is formed on the entire region of the inner surface of the pneumatic tire as an air permeation preventive layer. The resin layer 4 is formed of a thermoplastic resin or a thermoplastic elastomeric composition obtained by dispersing an elastomer in a thermoplastic resin.

As shown in FIG. 1, a noise absorbing member 5 formed of a porous material is attached to the inner surface of the tread portion 1. The noise absorbing member 5 includes a plurality of internal cells to have a certain noise absorbing characteristic based on the porous structure. As the porous material for the noise absorbing member 5, a polyurethane foam is preferably used. As means for fixing the noise absorbing member 5 and the resin layer 4, employed is thermal fusion bonding using a plate-shaped locking member 7 (a locking plate or a locking chip) made of a thermoplastic resin. Specifically, the noise absorbing member 5 is disposed on the resin layer 4, and then the locking member 7 is bonded to the resin layer 4 through the noise absorbing member 5 by thermal fusion. The thermal-fusion-bonding portion may be disposed in one position on the tire periphery, but preferably be disposed in a plurality of portions, and more preferably be disposed in 4 or more portions desirably at regular intervals in the tire circumferential direction.

It is preferable that the constituent material of the locking member 7 be the same kind of a thermoplastic resin as the resin included in the resin layer 4. When the resin layer 4 includes a plurality of kinds of resins as a matrix, the constituent material of the locking member 7 may be the same as any one of the resins included in the resin layer 4. Although, it is desirable that the fusing temperature of the locking member 7 and the fusing temperature of the resin layer 4 approximate to each other for the purpose of facilitating the thermal fusion bonding, the difference between the fusing temperatures may be not more than 20° C. The difference between the fusing temperature of the locking member 7 and the fusing temperature of the resin layer 4 is preferably 10° C. or less, and more preferably is 5° C. or less.

Figure 2:
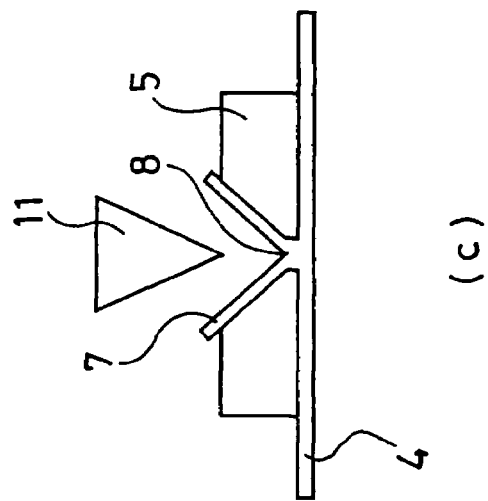
FIG. 2 show an example of a method of thermal fusion bonding of a locking member and a resin layer.
Figure 2:
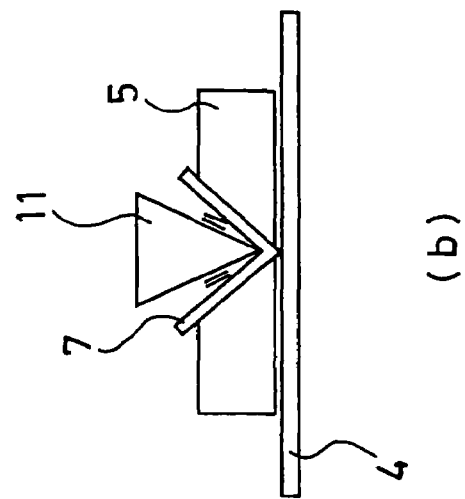
Figure 2:
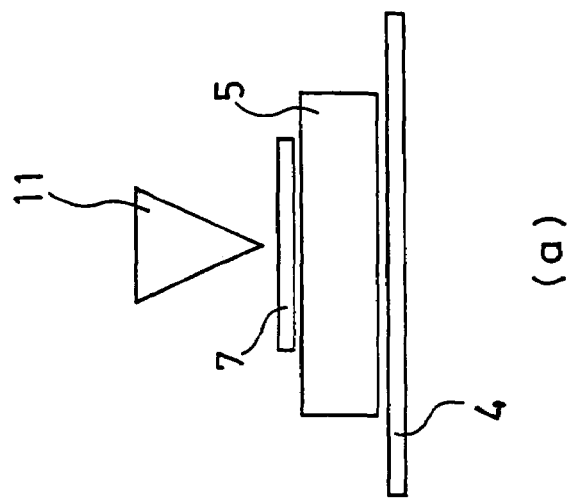

FIGS. 2(a) to 2(c) show an example of a method of thermal fusion bonding of the locking member and the resin layer. Firstly, as shown in FIG. 2(a), the noise absorbing member 5 is disposed on the resin layer 4, and further the plate-shaped locking member 7 formed of a thermoplastic resin is disposed on the noise absorbing member 5. Next, as shown in FIG. 2(b), an oscillating horn 11 for an ultrasonic welder is pressed against the locking member 7, so that the locking member 7 is in a bent state. Then, the tip portion where the locking member 7 is bent is locally heated. As a result of the heating, as shown in FIG. 2(c), a thermal-fusion-bonding portion 8 is formed by bonding the locking member 7 to the resin layer 4 through the noise absorbing member 5 by thermal fusion.

Figure 3:
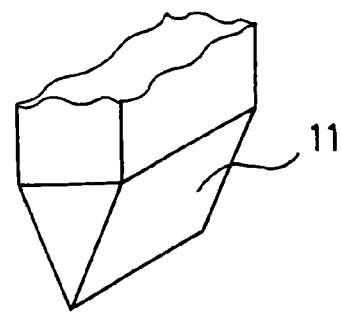
FIG. 3 is a perspective view showing an example of an oscillating horn for an ultrasonic welder.
Figure 4:
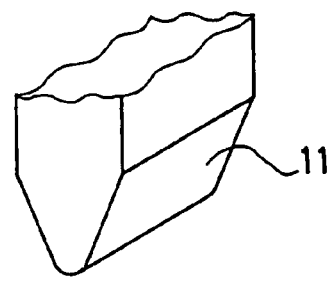
FIG. 4 is a perspective view showing another example of an oscillating horn for an ultrasonic welder.
Figure 5:
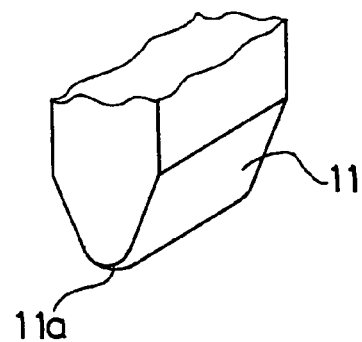
FIG. 5 is a perspective view showing still another example of an oscillating horn for an ultrasonic welder.
Figure 6:
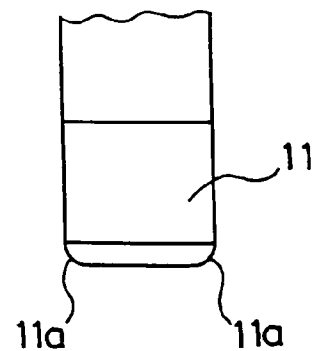
FIG. 6 is a front view of the oscillating horn shown in FIG. 5.

In the thermal fusion bonding using the ultrasonic welder, the shape of the oscillating horn 11 is not particularly limited. For example, the oscillating horns 11 having the shapes as shown in FIGS. 3 to 5 may be employed. In FIG. 3, the oscillating horn 11 has a tip processed into a sharp linear shape. In FIG. 4, the oscillating horn 11 has a tip processed into a long and thin rectangular surface. In FIG. 5, the oscillating horn 11 has a tip processed into a long and thin rectangular surface, and further has chamfered portions 11a formed in both end portions of the tip in the width direction thereof. FIG. 6 is a side view of the oscillating horn shown in FIG. 5. It is preferable that the radius of curvature of each chamfered portion 11a be 2 mm or more. The chamfering of both end portions, in the width direction, of the tip of the oscillating horn 11, makes it possible to suppress an occurrence of a whitening phenomenon in the locking member 7 due to the pressing of the oscillating horn 11.

Figure 7:
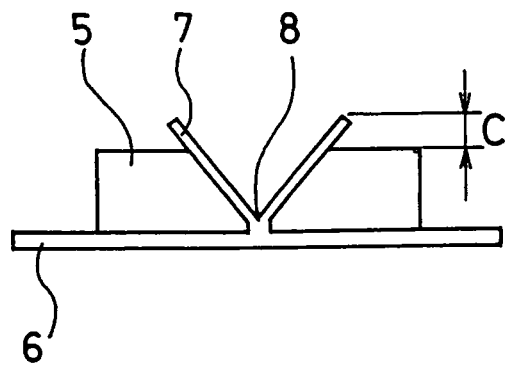
FIG. 7 is a cross-sectional view showing a structure in which thermal fusion bonding is performed on the locking member.
Figure 8:
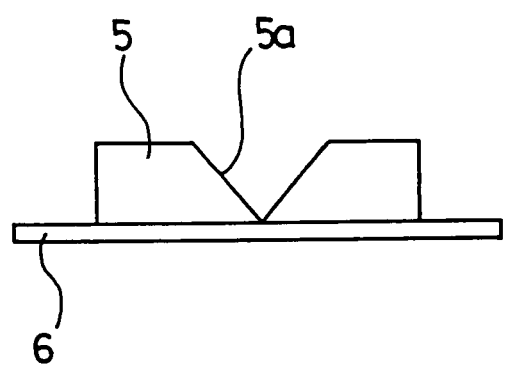
FIG. 8 is a cross-sectional view showing a noise absorbing member to which a notch portion is provided in advance.
Figure 9:
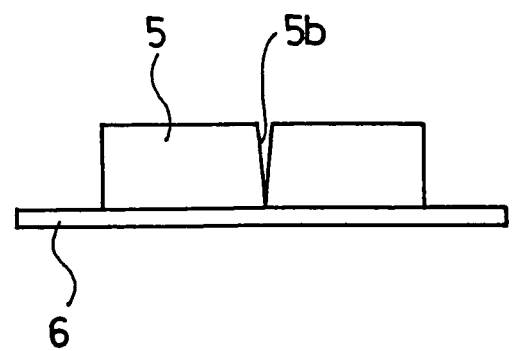
FIG. 9 is a cross-sectional view showing the noise absorbing member to which a cut is provided in advance.

In the thermal fusion bonding using the ultrasonic welder, the dimensions and the shape of the locking member 7 are not particularly limited. The shape of the locking member 7 may be, for example, a quadrangle. In this case, it is preferable to round the corners of the quadrangle. This makes it possible to reduce the damaging of the noise absorbing member 5 caused by the locking member 7. In addition, as shown in FIG. 7, in a state where the locking member 7 is bonded to the resin layer 4 by thermal fusion, it is preferable that the clearance C between each end portion of the locking member 7 and the upper surface of the noise absorbing member satisfy 0.5 mm≤C≤8.0 mm. When the clearance C is less than 0.5 mm, the noise absorbing member 5 is likely to be damaged by the locking member 7. Even when the clearance C is more than 8.0 mm, a better result cannot be obtained than that of a case where the clearance C is 8.0 mm. Moreover, a notch portion 5a as shown in FIG. 8 or a cut 5b as shown in FIG. 9 may be provided to the noise absorbing member 5 in a portion where each locking member 7 is disposed.

In the above-described pneumatic tire, the resin layer 4 including a thermoplastic resin as a matrix is formed on the inner surface of the tire while the noise absorbing member 5 is disposed on the resin layer 4, and the locking member 7 is bonded to the resin layer 4 through the noise absorbing member 5 by thermal fusion. Accordingly, even when the noise absorbing member 5 is formed of a thermosetting resin, such as a polyurethane foam, it is possible to firmly fix the noise absorbing member 5 to the resin layer 4. The fixation by thermal fusion bonding has an adhesive force stronger than the fixation by a rubber adhesive agent or an adhesive tape. As a result, it is possible to improve the adhesion of the noise absorbing member 5 formed of a porous material.

Figure 10:
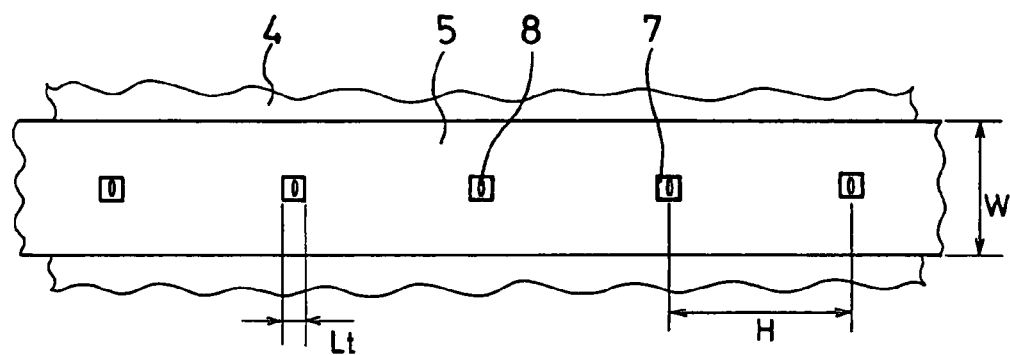
FIG. 10 is a plan view showing a state where the noise absorbing member attached to the inner surface of the tire is expanded on the plane.

FIG. 10 shows a state where the noise absorbing member attached to the inner surface of the tire is expanded on the plane. As shown in FIG. 10, the thermal-fusion-bonding portions 8 of the locking members 7 and the resin layer 4 are disposed at intervals (pitches) in the tire circumferential direction, and the relation between the interval H and the width W of the noise absorbing member 5 may be 0.2W≤H≤4W. When the relation is 0.2W>H, the workability at the time of thermal fusion bonding is reduced. When the relation is H>4W, the bonding state of the noise absorbing member 5 to the resin layer 4 is unstable. It should be noted that the positions of the thermal-fusion-bonding portions 8 are not necessarily placed at equal intervals. In addition, the length Lt (the dimension before thermal fusion bonding) of each locking member 7 may be in a range from 50% to 200% of the thickness of the noise absorbing member 5. Moreover, the thickness of each locking member 7 may be in a range from 50% to 150% of the thickness of the resin layer 4.

Figure 11:
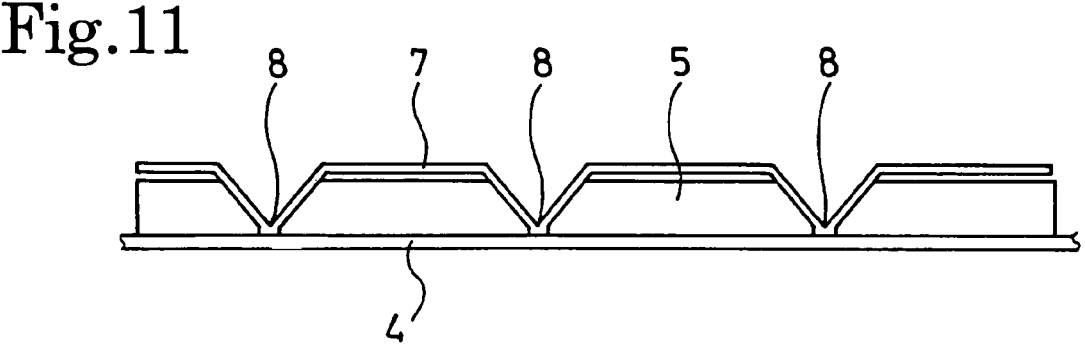
FIG. 11 is a cross-sectional view showing a state where a modified example of an attachment structure of the noise absorbing member attached to the inner surface of the tire is expanded on the plane.
Figure 12:
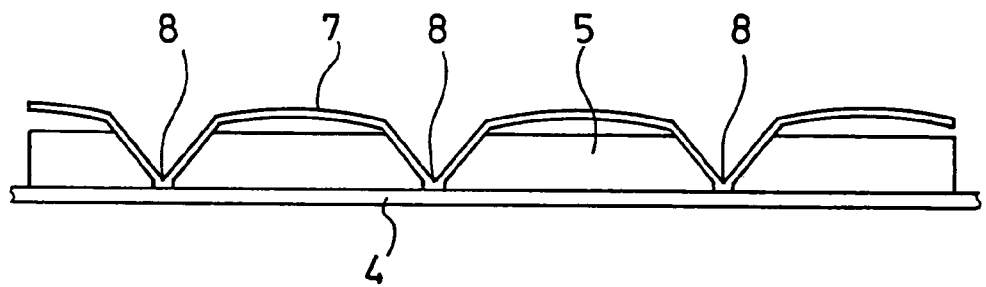
FIG. 12 is a cross-sectional view showing a state where a modified example of an attachment structure of the noise absorbing member attached to the inner surface of the tire is expanded on the plane.

Each of FIGS. 11 and 12 shows a state where a modified example of the attachment structure of the noise absorbing member attached to the inner surface of the tire. In FIG. 11, the locking member 7 extends along the resin layer 4 continuously in the tire circumferential direction, and is fixed to the resin layer 4 with a plurality of the thermal-fusion-bonding portions 8. In FIG. 12, although the locking member 7 extends along the resin layer 4 continuously in the tire circumferential direction as in the same manner as that in FIG. 11, the locking member 7 has some extra length for allowance.

Figure 13:
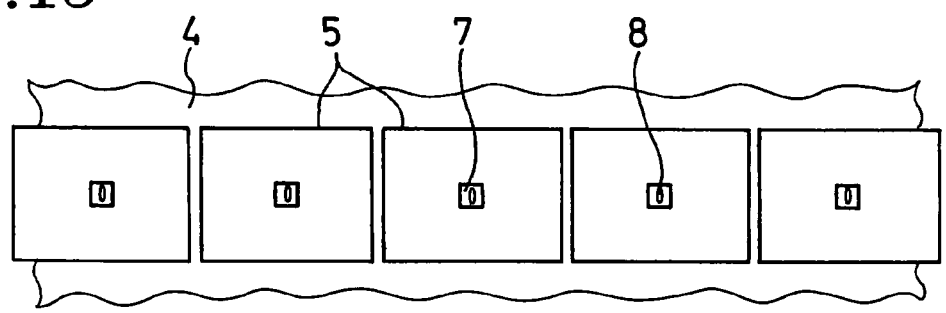
FIG. 13 is a plan view showing the state where the modified example of the attachment structure of the noise absorbing member attached to the inner surface of the tire is expanded on the plane.
Figure 14:
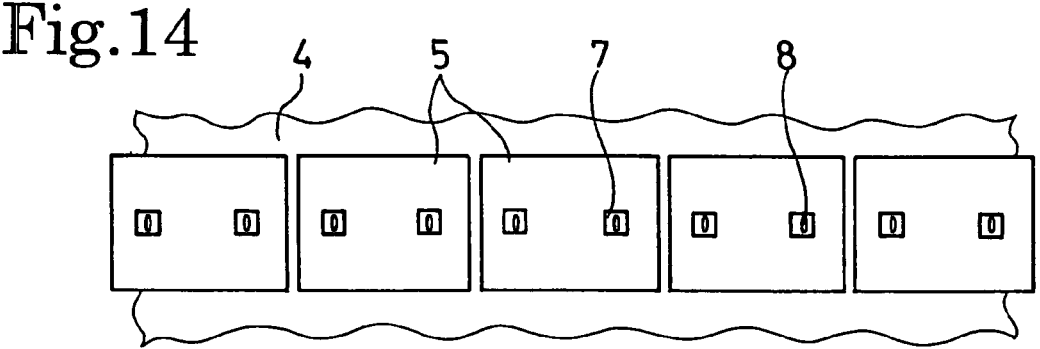
FIG. 14 is a plan view showing the state where the modified example of the attachment structure of the noise absorbing member attached to the inner surface of the tire is expanded on the plane.

Each of FIGS. 13 and 14 shows a state where a modified example of the noise absorbing member attached to the inner surface of the tire is expanded in the plane. As shown in each of FIGS. 13 and 14, the noise absorbing member 5 may be constituted of a plurality of separate pieces, and then the separate pieces may be aligned along the resin layer 4 in the tire circumferential direction. In this case, it is preferable that each separate piece of the noise absorbing member 5 be bonded to the resin layer 4 in at least two positions by thermal fusion.

Hereinafter, descriptions will be given in detail of the constituent material of the resin layer formed on the inner surface of the tire. This resin layer is, as described above, formed of a thermoplastic resin or a thermoplastic elastomeric composition obtained by dispersing an elastomer in a thermoplastic resin. In a case where the resin layer is formed on the entire region of the inner surface of the tire as an air permeation preventive layer, it is preferable that a thermoplastic elastomeric composition be used as the constituent material of the resin layer.

As a thermoplastic resin component of the thermoplastic elastomeric composition, any thermoplastic resin having a Young's modulus of more than 500 MPa, preferably, 500 MPa to 3000 MPa may be used. The blending proportion of the thermoplastic resin component may be not less than 10% by weight, preferably be 20 to 80% by weight, based on the total weight of polymeric components including the resin and the elastomer.

Examples of such a thermoplastic resin include polyamide resins (for example, Nylon 6 (N6), Nylon 66 (N66), Nylon 46 (N46), Nylon 11 (N11), Nylon 12 (N12), Nylon 610 (N610), Nylon 612 (N612), Nylon 6/66 copolymer (N6/66), Nylon 6/66/610 copolymer (N6/66/610), Nylon MXD6, Nylon 6T, Nylon 6/6T copolymer, Nylon 66/PP copolymer and Nylon 66/PPS copolymer), polyester resins (for example, aromatic polyesters including polybutylene terephthalate (PBT), polyethylene terephthalate (PET), polyethylene isophthalate (PEI), polybutylene terephthalate/tetramethylene glycol copolymer, PET/PEI copolymer, polyarylate (PAR), polybutylene naphthalate (PBN), liquid crystal polyester, polyoxyalkylene diimide diacid/polybutylene terephthalate copolymer), polynitrile resins (for example, polyacrylonitrile (PAN), polymethacrylonitrile, acrylonitrile/styrene copolymer (AS), methacrylonitrile/styrene copolymer, methacrylonitrile/styrene/butadiene copolymer), poly(meth)acrylate resins (for example, polymethyl methacrylate (PMMA), polyethyl methacrylate, ethylene/ethyl acrylate copolymer (EEA), ethylene/acrylic acid copolymer (EAA), ethylene methyl acrylate resin (EMA)), polyvinyl resins (for example, vinyl acetate (EVA), polyvinyl alcohol (PVA), ethylene/vinyl alcohol copolymer (EVOH), polyvinylidene chloride (PVDC), polyvinyl chloride (PVC), vinyl chloride/vinylidene chloride copolymer, vinylidene chloride/methyl acrylate copolymer), cellulose resins (for example, cellulose acetate, cellulose acetate butyrate), fluororesins (for example, polyvinylidene difluoride (PVDF), polyvinyl fluoride (PVF), polychlorotrifluoroethylene (PCTFE), ethylene/tetrafluoroethylene copolymer (ETFE)), imide resins (for example, aromatic polyimide (PI)). These thermoplastic resins may be used solely as a resin material not including an elastomeric component.

As the elastomeric component of the thermoplastic elastomeric composition, any elastomer having a Young's modulus of 500 MPa or less may be used. Alternatively, it is also possible to use an elastomeric composition obtained by blending, to the elastomer, a necessary amount of a compounding agent, such as a reinforcer, a filler, a crosslinker, a softener, an antioxidant and a processing aid, for improving the dispersibility, the heat resistance or the like of the elastomer. The blending proportion of the elastomeric component may be 10% or more by weight, or preferably be 10 to 80% by weight, based on the total weight of the polymeric components including the resin and the elastomer.

Examples of such an elastomer include diene rubbers and hydrogenated products thereof (for example, NR, IR, epoxidized natural rubber, SBR, BR (high cis BR and low cis BR), NBR, hydrogenated NBR, hydrogenated SBR), olefin rubbers (for example, ethylene propylene rubber (EPDM, EPM), maleic acid modified ethylene propylene rubber (M-EPM)), polyisobutylene-isoprene rubber (IIR), isobutylene and aromatic vinyl or diene monomer copolymer, acrylic rubbers (ACM), ionomers, halogenated rubbers (for example, Br-IIR, Cl-IIR, brominated isobutylene para-methyl styrene copolymer (Br-IPMS), chloroprene rubber (CR), hydrin rubber (CHC, CHR), chlorosulfonated polyethylene (CSM), chlorinated polyethylene (CM), maleic acid modified chlorinated polyethylene (M-CM)), silicone rubbers (for example, methyl vinyl silicone rubber, dimethyl silicone rubber, methylphenylvinyl silicone rubber), sulfur-containing rubbers (for example, polysulfide rubber), fluoro rubbers (for example, vinylidene fluoride rubbers, fluorine-containing vinyl ether rubbers, tetrafluoro ethylene-propylene rubbers, fluorine-containing silicone rubbers, fluorine-containing phosphazene rubbers), thermoplastic elastomers (for example, styrene elastomer, olefin elastomer, polyester elastomer, urethane elastomer, polyamide elastomer).

As a third component, another polymer or a compounding agent, such as a compatibilizer, may be mixed with the thermoplastic elastomeric composition, in addition to the above-described necessary components. The purposes of mixing another polymer are to improve the compatibility of the thermoplastic resin component and the elastomeric component, to enhance the processability and formability of the material into a film, to improve the heat resistance, to reduce the manufacturing costs, and the like. Examples of a material used as such a polymer for these purposes include polyethylene, polypropylene, polystyrene, ABS, SBS, polycarbonate.

The thermoplastic elastomeric composition is obtained by melting and kneading the thermoplastic resin and the elastomer (when a rubber is used, the rubber is unvulcanized one) in advance by using a twin-screw kneading extruder or the like, and by then dispersing the elastomeric component in the thermoplastic resin forming a continuous phase. In a case where the elastomeric component is to be vulcanized, the elastomer may be vulcanized dynamically by adding a vulcanizing agent under the kneading. In addition, the various compounding agents (except the vulcanizing agent) to the thermoplastic resin or the elastomeric component may be added during the kneading, but preferably be mixed with the thermoplastic resin or the elastomeric component in advance before the kneading. A kneading machine used for the kneading of the thermoplastic resin and the elastomer is not particularly limited, and a screw extruder, a kneader, a Banbury mixer, a twin-screw kneading extruder or the like may be used. Among these, it is preferable that the twin-screw kneading extruder be used for the kneading the resin component and the rubber component, and for the dynamic vulcanization of the rubber component. In addition, it is also possible to use two or more kinds of kneading machines, and to then sequentially perform the kneading. As conditions for the melting and kneading, the temperature may be not less than that at which the thermoplastic resin is melted. In addition, the shear rate at the time of the kneading is preferably 2500 to 7500 sec$^{-1}$. The total time length for the kneading is preferably 30 seconds to 10 minutes. When the vulcanizing agent is added, the time length for the vulcanization after the adding of the vulcanizing agent is preferably 15 seconds to 5 minutes. The thermoplastic elastomeric composition prepared by the above-described method is shaped into a film by extrusion using a resin extruder, or by calendaring. As the method of shaping the thermoplastic elastomeric composition into a film, a general method of shaping a thermoplastic resin or a thermoplastic elastomer into a film may be employed.

The above described thermoplastic elastomeric composition is used for building a tire in a state of being shaped into a sheet or a film. For the purpose of enhancing the adhesion with an adjacent rubber, an adhesive layer may be stacked on the sheet or the film. Specific examples of an adhesive polymer composing the adhesive layer include ultra high molecular weight polyethylene (UHMWPE) having a molecular weight of 1 million or more, preferably of 3 millions or more; an acrylate copolymer, such as ethylene ethyl acrylate copolymer (EEA), ethylene methyl acrylate resin (EMA), ethylene acrylic acid copolymer (EAA) and the like, and a maleic anhydride adduct of the acrylate copolymer; polypropylene (PP) and maleic acid modified product thereof, ethylene propylene copolymer and a maleic acid modified product thereof, polybutadiene resin and maleic acid anhydride modified product thereof, styrene-butadiene-styrene copolymer (SBS); styrene-ethylene-butadiene-styrene copolymer (SEBS), a thermoplastic fluorine resin; a thermoplastic polyester resin; and the like. The thickness of the adhesive layer is not particularly limited, but may be small for reducing the weight of a tire, and preferably be 5 μm to 150 μm.

Descriptions have been given in detail above of the preferred embodiments of the present invention. It should be understood that various modifications, alternations and substitutions can be made on the embodiments as long as not departing from the spirit and the scope of the present invention, which are defined by the scope of the appended claims.

EXAMPLES

Pneumatic tires of Conventional Example and Examples 1 and 2 (tire size: 215/55R16) were prepared. In the pneumatic tire of Conventional Example, a noise absorbing member formed of a band-shaped urethane foam (a width of 150 mm by a thickness of 20 mm) was fixed to the inner surface of the tread portion across the entire circumference of the tire by using a rubber adhesive agent. On the other hand, in each of the pneumatic tires of Examples 1 and 2, while a resin layer formed of a thermoplastic elastomeric composition was formed on the entire region of the inner surface of the tire, a noise absorbing member formed of a band-shaped urethane foam (a width of 150 mm by a thickness of 20 mm) was disposed on the resin layer, on the inner side of the tread portion, across the entire circumference of the tire. Then, locking chips were disposed at intervals of approximately 200 mm each on the noise absorbing member along the tire circumferential direction. The locking chips were then bonded to the resin layer by thermal fusion using the ultrasonic welder. It should be noted that the difference between the fusing temperature of the locking members and the fusing temperature of the resin layer was set at approximately 30° C. in Example 1 while the difference between the fusing temperature of the locking members and the fusing temperature of the resin layer was set at approximately 5° C. in Example 2.

A running test was performed on each of the pneumatic tires of Conventional Example as well as Examples 1 and 2 by using a drum testing machine under the conditions of an internal pressure of 150 kPa and a speed of 80 km/h, so that the distance for which the tire ran until the noise absorbing member was detached was measured. The results of the tests are shown in Table 1. The evaluation results are indicated by indices where the evaluation result of Conventional Example is taken as 100. The larger the index is, the more favorable the durability of the tire is.

TABLE 1

|  | Conventional Example | Example 1 | Example 2 |
| --- | --- | --- | --- |
| Means for Fixing Noise Absorbing Member | Adhesive Agent | Thermal Fusion Bonding | Thermal Fusion Bonding |
| Difference in Fusing Temperature between Locking Members and Resin Layer (° C.) | — | 30 | 5 |
| Running Distance (Index) | 100 | 110 | 143 |

As is clear from Table 1, each of the pneumatic tires of Examples 1 and 2 exhibited an improved durability, as compared with the pneumatic tire of Conventional Example. The improvement in the durability was outstanding particularly in Example 2.

What is claimed is:

1. A pneumatic tire comprising:
a resin layer which is formed of any one of a thermoplastic resin and a thermoplastic elastomeric composition obtained by dispersing an elastomer in a thermoplastic resin, and which is formed on at least a part of the inner surface of the tire;
a noise absorbing member which is formed of a porous material, and which is disposed on the resin layer; and
a locking member which is formed of a thermoplastic resin, a portion of the locking member being bent and bonded to the resin layer through the noise absorbing member by thermal fusion;
wherein the locking member is smaller in width than the noise absorbing member so that a portion of the noise absorbing member outside the locking member is exposed to a hollow space of the tire,
wherein the porous material of the noise absorbing member is a polyurethane foam; and
wherein the polyurethane foam is partially compressed owing to the necessity of the locking member being pressed into contact with the resin layer on the inner surface of the tire to which the locking member is fused.

2. The pneumatic tire according to claim 1, wherein the constituent material of the locking member is the same kind of a thermoplastic resin as that included in the resin layer.

3. The pneumatic tire according to claim 1, wherein the difference between the fusing temperature of the locking member and the fusing temperature of the resin layer is not more than 20° C.

4. The pneumatic tire according to any one of claims 1 to 3, wherein the resin layer is formed on the entire region of the inner surface of the tire as an air permeation preventive layer.

5. The pneumatic tire according to any one of claims 1 to 3, wherein the locking member has a plate shape.

6. The pneumatic tire according to any one of claims 1 to 3, wherein
a portion where the locking member and the resin layer are bonded to each other by thermal fusion is disposed at an interval in the tire circumferential direction, and
the relation between the interval H and the width W of the noise absorbing member is $0.2W \leq H \leq 4W$.

* * * * *